United States Patent
Ohkoshi (10) Patent No.: US 7,845,226 B2
(45) Date of Patent: *Dec. 7, 2010

(54) COMPOSITE SENSOR

(75) Inventor: Hideo Ohkoshi, Osaka (JP)

(73) Assignee: Panasonic Corporation, Osaka (JP)

( * ) Notice: Subject to any disclaimer, the term of this patent is extended or adjusted under 35 U.S.C. 154(b) by 270 days.

This patent is subject to a terminal disclaimer.

(21) Appl. No.: 11/916,913

(22) PCT Filed: Jun. 7, 2006

(86) PCT No.: PCT/JP2006/311433

§ 371 (c)(1),
(2), (4) Date: Dec. 7, 2007

(87) PCT Pub. No.: WO2006/132277

PCT Pub. Date: Dec. 14, 2006

(65) Prior Publication Data

US 2009/0100929 A1 Apr. 23, 2009

(30) Foreign Application Priority Data

Jun. 9, 2005 (JP) .............................. 2005-169150

(51) Int. Cl.
G01P 1/02 (2006.01)
G01P 15/08 (2006.01)
G01C 19/56 (2006.01)

(52) U.S. Cl. ...................... 73/493; 73/511; 73/504.16; 73/514.29

(58) Field of Classification Search .................. 73/511, 73/510, 493, 504.12, 504.16, 514.29, 514.16, 73/431

See application file for complete search history.

(56) References Cited

U.S. PATENT DOCUMENTS 7,004,025 B2 * 2/2006 Tamura ....................... 73/511
7,028,547 B2 * 4/2006 Shiratori et al. ............... 73/495
2004/0200279 A1 10/2004 Mitani et al.
2009/0013784 A1 * 1/2009 Ohkoshi ................. 73/504.16

FOREIGN PATENT DOCUMENTS

| JP | 10-239064 | 9/1998 |
|---|---|---|
| JP | 2002-257552 | 9/2002 |
| JP | 2003-4450 | 1/2003 |

OTHER PUBLICATIONS

International Search Report issued Sep. 12, 2006 in the International Application No. PCT/JP2006/311433.

* cited by examiner

*Primary Examiner*—Helen C. Kwok
(74) *Attorney, Agent, or Firm*—Wenderoth, Lind & Ponack, L.L.P.

(57) ABSTRACT

A composite sensor includes an external holding portion, an internal holding portion supported within the external holding portion via coupling portion, and a vibration-type angular velocity sensor element and an acceleration sensor element disposed within the internal holding portion, and is configured so that the internal holding portion is held in such a manner so as to substantially suppress a movement of the acceleration sensor element along a detection direction while to allow a movement of the vibration-type angular velocity sensor element in a direction in which it receives Coriolis force at least by an angular velocity. A reduction of the composite sensor in size can be achieved by this structure.

12 Claims, 6 Drawing Sheets

COMPOSITE SENSOR

BACKGROUND OF THE INVENTION

I. Technical Field

The present invention relates to a composite sensor equipped with a vibration-type angular velocity sensor element and an acceleration sensor element.

II. Description of the Related Art

For a composite sensor of this type, a structure having an exterior package in which a vibration-type angular velocity sensor formed by packaging therein a vibration-type angular velocity sensor element and a signal processing circuit such as an IC are disposed, and an acceleration sensor formed by packaging therein an acceleration sensor element and a signal processing circuit thereof are known. As prior art reference information relating to the present application see, for example, JP-A-2003-4450.

There has been an increasing need for a composite sensor to further reduce the size, as a system incorporating such composite sensors becomes more compact and expands in functionality. A possible structure to meet this need is to integrally package the vibration-type angular velocity sensor element and the acceleration sensor element that are generally packaged separately.

However, it is not necessarily easy to package both sensor elements integrally. Because the vibration-type angular velocity sensor detects an angular velocity about a detection axis of the vibration-type sensor element, there is a need to interpose a damper furnished with a vibration absorbing capability for suppressing an influence of disturbance, such as an external impact in packaging the vibration-type angular velocity sensor element to the exterior package. In contrast, because the acceleration sensor element detects acceleration with respect to a detection direction at a higher degree of accuracy, it has to be fixed rigidly to the exterior package for the acceleration added to the exterior package to be transmitted directly in packaging the acceleration sensor element to the exterior package.

Hence, in the case where the vibration-type angular velocity sensor element that needs a buffering structure, such as a damper, and the acceleration sensor element that needs a rigid fixing structure are incorporated together in a single package, the characteristics as the composite sensor would be deteriorated unless the mutually contradictory needs for both sensor elements were satisfied. A separate attaching structure for each has therefore been necessary, which consequently makes it difficult to reduce the composite sensor in size.

SUMMARY OF THE INVENTION

An object of the present invention is to provide a composite sensor which is reduced in size by solving the problems discussed above.

In order to achieve the above and other objects, the present invention is a composite sensor provided with an external holding portion, an internal holding portion supported within the external holding portion via coupling portions, a vibration-type angular velocity sensor element, and an acceleration sensor element disposed within the internal holding portion, the composite sensor is configured, in particular, to hold the internal holding portion so as to substantially suppress a movement of the acceleration sensor element along a detection direction while to allow a movement of the vibration-type angular velocity sensor element along a direction in which the vibration-type angular velocity sensor element receives Coriolis force at least by an angular velocity.

DETAILED DESCRIPTION OF THE INVENTION

Hereinafter, the best mode for carrying out the present invention will be described in detail with reference to the drawings.

One embodiment of the present invention will be described below using the drawings.

Figure 1:
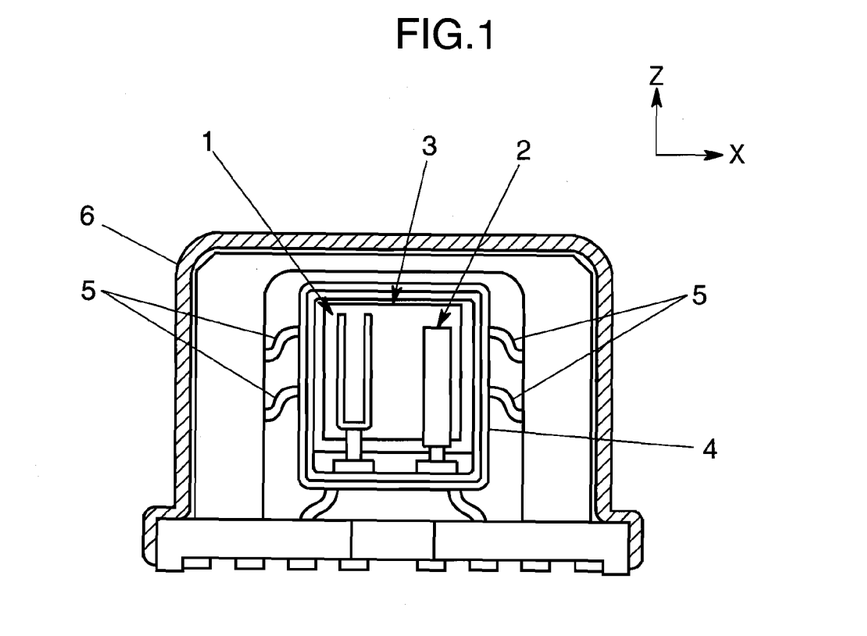
FIG. 1 is a schematic longitudinal cross section of a composite sensor according to one embodiment of the present invention.

FIG. 1 shows a composite sensor in which a vibration-type angular velocity sensor element 1 and an acceleration sensor element 2 are integrated in one unit. In the descriptions below, X is defined as the right-left direction, Y as a direction perpendicular to the sheet surface, and Z as the top-bottom direction of the sheet surface of FIG. 1 for the descriptions regarding the directions in the drawing and the other respective drawings. Also, the right side of the sheet surface of FIG. 2 in the Y direction is tentatively defined as the front.

According to the basic structure of the composite sensor, the vibration-type angular velocity sensor element 1 and the acceleration sensor element 2, and an integrated circuit 3, as an example of a processing circuit that processes an output signal from the foregoing, are packaged integrally in an interior package 4, as an example of an internal holding portion, and the interior package 4 is accommodated within an exterior package 6 as an example of an external holding portion via coupling members 5 as an example of coupling portions.

Figure 2:
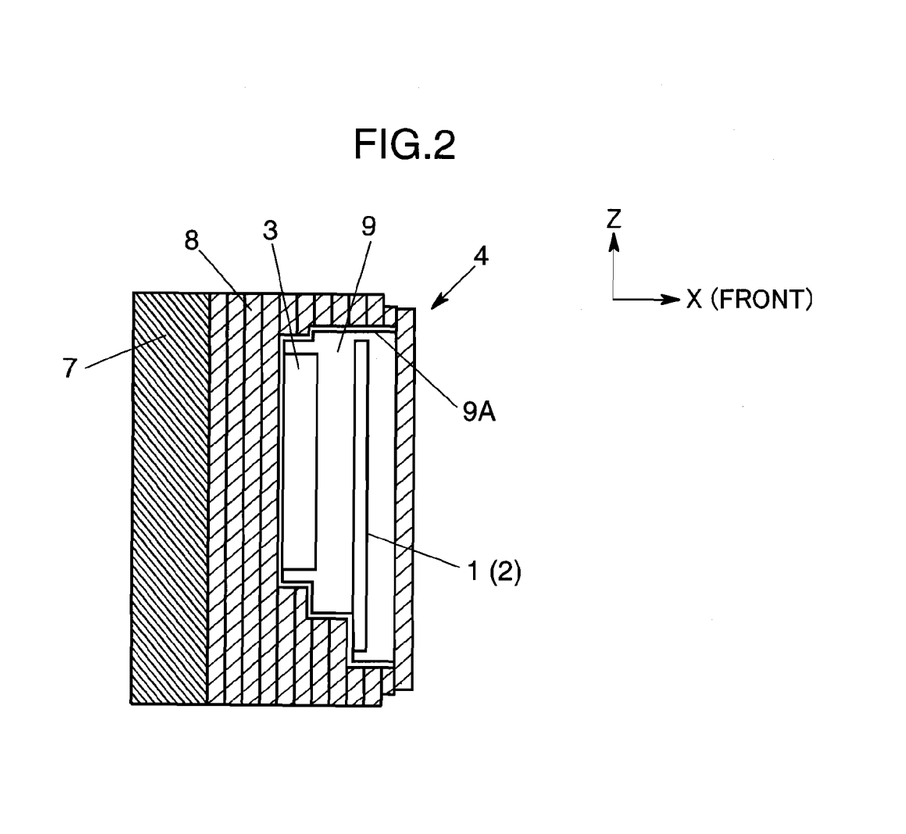
FIG. 2 is a schematic traverse cross section showing the interior portion of an interior package of the composite sensor.

As is shown in FIG. 2, the interior package 4 is formed of a resin plate 7 on the rear side and a ceramic laminated substrate 8 on the front side. It is configured in such a manner that a step-shaped depressed portion 9 that depresses narrower on the rear side is formed in the front portion of the ceramic laminated substrate 8, and the vibration-type angular velocity sensor element 1 and the acceleration sensor element 2 are mounted on the front surface while the integrated circuit 3 is mounted on the rear surface to be spaced apart in the Y direction from the both sensor elements 1 and 2. As has been described, the interior package 4 in this embodiment has the resin plate 7 and the ceramic laminated substrate 8 layered on the resin plate 7, and the vibration-type angular velocity sensor element 1, the acceleration sensor element 2, and the integrated circuit 3 are accommodated in the depressed portion 9 provided in the ceramic laminated substrate 8. Hence, because the respective sensor elements 1 and 2 and the integrated circuit 3 are accommodated in the ceramic laminated substrate 8, the insulation performance and the temperature and humidity stabilities are enhanced. In addition, because the integrated circuit 3 is disposed in a state where it is adhesively attached to the ceramic laminated substrate 8 across the entire surface, it is possible to release heat from the integrated circuit 3 more efficiently.

Also, in this embodiment, the depressed portion 9 of the interior package 4 is formed in the shape of multiple steps. The vibration-type angular velocity sensor element 1 and the acceleration sensor element 2 are mounted on a step on the front side, whereas the integrated circuit 3 is mounted on a step different from the step on which the vibration-type angular velocity sensor element 1 and the acceleration sensor element 2 are mounted, so that the integrated circuit 3 defines a space from the vibration-type angular velocity sensor element 1 and the acceleration sensor element 2. Hence, by defining a space between the respective sensor elements 1 and 2 and the integrated circuit 3, it is possible to reduce an influence of heat from the integrated circuit 3 to the extent possible. Further, because both sensor elements 1 and 2 can be disposed within the plane of the integrated circuit 3, a contribution can be made to a further reduction in size.

In this embodiment, a shield coating 9A is applied to the inner wall of the depressed portion 9, and it is configured in such a manner that noises are eliminated by this shield coating 9A. The shield coating 9A, however, can be omitted.

Figure 3:
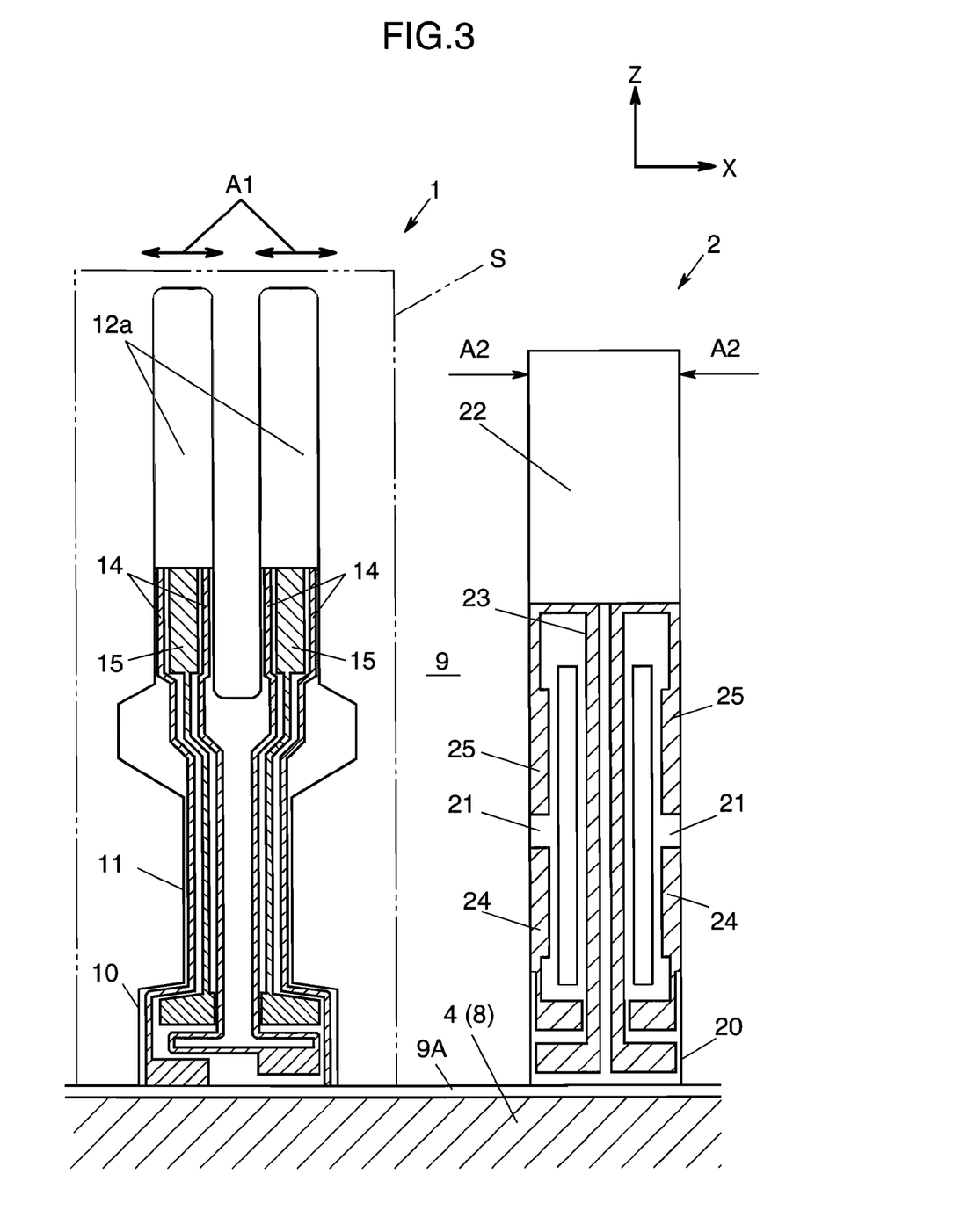
FIG. 3 is a schematic partially broken view showing the composite sensor.

As is shown on the left side of FIG. 3, the vibration-type angular velocity sensor element 1 forms a fork resonator. To be more concrete, the vibration-type angular velocity sensor element 1 includes a base 10 fixed onto the interior package 4, a stem portion 11 protruding from the base 10 along the Z direction, a thin-plate-shaped vibrating portion 12 bifurcating at the top end of the stem portion 11 and extending in the Z direction, a pair of branch pieces 12a forming the vibrating portion 12, and driving electrodes 14 and detecting electrodes 15 incorporated from the both branch pieces 12a to the base 10. The driving electrodes 14 and the detecting electrodes 15 are of a configuration in which the top and bottom surfaces of a piezoelectric thin film made of PZT ($PbZrO_3$—$PbTiO_3$) are sandwiched between thin-plate-shaped conductive materials. In detection of angular velocity by the vibration-type angular velocity sensor element 1, the free ends of the branch pieces 12a vibrate along the X direction as is indicated by arrows A1 as a driving voltage is applied to the driving electrodes 14. In this vibrating state, the vibration-type angular velocity sensor element 1 bends in the Y direction (see FIG. 2) by Coriolis force as acceleration about the Z axis (detection axis) is added to a system (for example, a vehicle) incorporating the vibration-type angular velocity sensor element 1. A detection signal from the detecting electrodes 15 on the basis of this bending in the Y direction are outputted as the angular velocity.

Also, as is shown on the right side of FIG. 3, the acceleration sensor element 2 forms a resonator formed of a silicon plate extending in the Z direction as a whole. To be more concrete, the acceleration sensor element 2 forms a base 20 fixed onto the interior package 4, chord portions 21 which are integral with the top portion of the base 20, and a spindle portion 22 which is integral with the top portions of the chord portions 21 as one unit. The chord portions 21 have a hollow stem portion 23 extending in a space between the base 20 and the spindle portion 22, a pair of driving electrodes 24 paired with each other to oppose in the width direction of the acceleration sensor element 2 (the X direction of the composite sensor when assembled) with the stem portion 23 in between and protruding upward from the base 20 in a cantilevered manner, and a pair of detection electrodes 25 paired with each other to oppose in the width direction of the acceleration sensor element 2 (the X direction of the composite sensor when assembled) with the stem portion 23 in between to correspond to the driving electrodes 24 and hanging downward from the spindle portion 22. The driving electrodes 24 and the detection electrodes 25 are of a configuration in which the top and bottom surfaces of a piezoelectric thin film made of PZT ($PbZrO_3$—$PbTiO_3$) are sandwiched between thin-plate-shaped conductive materials. In a detection of acceleration by the acceleration sensor element 2, the chord portions 21 vibrate at a specific frequency as a driving voltage is applied to the driving electrodes 24. The chord portions 21 bend as the spindle portion 22 of the acceleration sensor element 2 in this state receives a force along the X direction as is indicated by arrows A2. This causes one of the chord portions 21 to extend and the other chord portion 21 to contract, and vibration frequencies of a pair of the chord portions 21 change independently. Changes of the vibration frequencies are outputted as a detection signal from the detection electrodes 25.

Also, in this composite sensor, the vibration-type angular velocity sensor element 1 and the acceleration sensor element 2 are incorporated in the interior package 4 in such a manner that the driving plane S of the vibration-type angular velocity sensor element 1, that is, a plane defined by loci of the branch pieces 12a of the vibration-type angular velocity sensor element 1 shown in FIG. 3 when vibrated in the direction indicated by the arrows A1 by the driving electrodes 14, and the detection direction of the acceleration sensor element 2, that is, the direction indicated by the arrows A2 in FIG. 3, are parallel to each other along the X direction in FIG. 1. Also, in the embodiment shown in the drawings, as is obvious from FIG. 3, the bases 10 and 20 of both sensor elements 1 and 2, respectively, are provided in a state where they stand side by side on the same surface of the interior package 4. In this manner of configuration, because both sensor elements 1 and 2 can be aligned in close proximity to the extent possible, it is possible to set the dimension in the side-by-side alignment direction shorter.

Referring to FIG. 1, the interior package 4 is attached to the exterior package 6 via coupling members 5 which is in an S shape in front view. The coupling members 5 are plate members made of metal that bend markedly along the front-rear direction (the Y direction in FIG. 2) and remain rigid to the extent possible in the right-left and top-bottom directions (the X and Z directions in FIG. 1). By adopting a plate member made of metal in this manner, it is possible to readily achieve the coupling members 5 that bend along only the Y direction and maintain the rigidity in the X direction and the Z direction. The plate shape of the coupling members 5 is in an S shape in order to secure high rigidity in the X and Z directions and high flexibility in the Y direction by increasing the extension distance in the Y direction within a limited space. As a concrete embodiment of the coupling members 5, plate springs made of phosphorous, bronze, beryllium steel, spring steel, and so forth are suitable. Alternatively, the coupling members 5 may be formed of a laminated body that increases the vibration damping effect by layering the metal member as described above and a damping member. Further, the coupling members 5 may also serve as a circuit component for electric conduction.

Also, in this embodiment, the interior package 4 is accommodated in a rectangular space provided in the exterior package 6. Of the inner peripheral surfaces of the exterior package 6, two coupling members 5 are provided to each of the bottom portion and both side portions. It is thus possible to change the specifications as needed in response to a total mass of the interior package 4, including the sensor elements 1 and 2 and the integrated circuit 3, and in response to the required flexibility and rigidity, so as to obtain a suitable characteristic for system by system to be used.

In this embodiment, the coupling members 5 couple both packages 4 and 6 to each other in such a manner that the bending direction (the Y direction) of the interior package 4 with respect to the exterior package 6 becomes perpendicular to the driving plane S (see FIG. 3) of the vibration-type angular velocity sensor element 1. In this embodiment, the coupling members 5 are disposed to portions at which at least the respective sensor elements 1 and 2 are fixed to the interior package 4. Accordingly, the coupling members 5 elastically support the portions where the disturbance is most readily propagated, and thereby able to absorb the disturbance.

According to this configuration, the coupling members 5 have high flexibility in the Y direction while securing high rigidity in the X direction and the Z direction. Hence, displacement of the interior package 4 in the Y direction enables the vibration-type angular velocity sensor element 1 to maintain the detection sensitivity to an angular velocity as high as possible by suppressing an influence of the disturbance, such as an external impact. Meanwhile, because an impact from the exterior package 6 along the X direction or the Z direction propagates intactly to the spindle portion 22 via the coupling members 5, the acceleration sensor element 2 is able to maintain the detection sensitivity to acceleration as high as possible.

Hence, even if the acceleration sensor element 2 and the vibration-type angular velocity sensor element 1 are combined into a composite as above, it is possible to secure the detection accuracy of each to a high level.

Consequently, even in a configuration in which the vibration-type angular velocity sensor element 1 and the acceleration sensor element 2 are incorporated together in a single interior package 4, it is possible to suppress the influence on the characteristic of one of the vibration-type angular velocity sensor element 1 and the acceleration sensor element 2 from the other one. Hence, because the integrated circuit 3 and the interior package 4, which are conventionally equipped to each sensor, can be shared as a consequence, it is possible to reduce the size of the composite sensor.

More specifically, in order to detect angular velocity, the vibration-type angular velocity sensor element 1 vibrates in the X direction and the loci along the X direction define the driving plane S. As the acceleration about the Z axis is added to a system (vehicle or the like) incorporating the composite sensor, the branch pieces 12a of the vibration-type angular velocity sensor element 1 bend in the Y direction, according to which the angular velocity is detected. On the other hand, because the exterior package 6 and the interior package 4 undergo relative displacement with respect to each other as the coupling members 5 bend, disturbance in the Y direction orthogonal to the driving plane S is absorbed by the displacement and hardly propagated to the vibration-type angular velocity sensor element 1. It is thus possible to reduce disturbance to the vibration-type angular velocity sensor element 1 to the extent possible.

Further, when acceleration in the X direction is added because of acceleration or the like of the system (vehicle or the like) incorporating the composite sensor, it is thought that the respective branch pieces 12a of the angular velocity sensor element 1 bend in the X direction by inertia force, or because they are vibrating, the center of vibration is shifted. However, Coriolis force is determined by the angular velocity and the velocity in the X direction by vibrations of the respective branch pieces 12a and it is not determined by the displacement of the branch pieces 12a. Hence, the state of the branch pieces 12a in which each bends in the X direction does not give any influence to the bending in the Y direction by Coriolis force. Also, when certain acceleration is added from a state where the acceleration is 0, it is thought that certain bending corresponding to the acceleration occurs (shifting of the center of oscillation in the X direction), and a state of the branch pieces 12a different from the state where, to be exact, the acceleration was 0 is generated during a transition period from a state where each does not bend to a state each bends to a certain degree. However, because such is a transitory and minor change, the influence thereof is negligible in practice. Hence, even if acceleration is generated in the X direction, it gives no influence to the detection of an angular velocity.

Meanwhile, by adopting the layout as described above, a force parallel to the driving plane S that has propagated to the system is transmitted to the interior package 4 from the exterior package 6 via the coupling members 5 and detected by the acceleration sensor element 2. Hence, when an impact is added to the system, acceleration on the basis of an impact can be detected high sensitivity despite the damper capability furnished to the coupling members 5. Consequently, it is possible to process a signal by the same integrated circuit 3 by incorporating the vibration-type angular velocity sensor element 1 and the acceleration sensor element 2 in the same interior package 4, which makes it possible to reduce the size of the overall composite sensor to the extent possible, while maintaining the detection ability of each sensor element at a high level.

Figure 4:
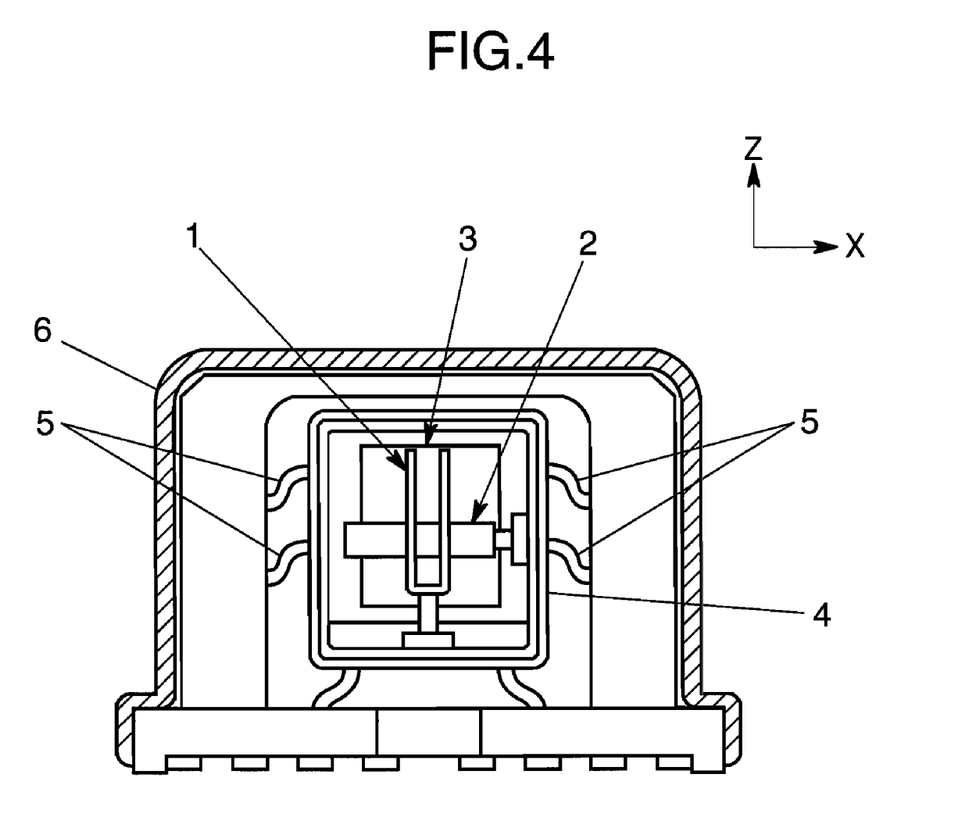
FIG. 4 is a schematic longitudinal cross section showing a composite sensor according to another embodiment.

This embodiment described the structure in which the vibration-type angular velocity sensor element 1 and the acceleration sensor element 2 are provided side by side within the interior package 4. However, it is sufficient to provide them so that the driving plane S of the vibration-type angular velocity element 1 and the detection direction A2 of the acceleration sensor element 2 are parallel to each other. Hence, even if they are held within the interior package 4 in positions as is shown in FIG. 4 for the detection axis (the axis in the Z direction) of the vibration-type angular velocity sensor element 1 and the detection direction of the acceleration sensor element 2 to go along in parallel, it is possible to achieve the same function and effect. According to the embodiment of FIG. 4, because both sensor elements 1 and 2 can be laid out within the dimensions in the height direction of the respective sensor elements 1 and 2, a contribution to a reduction in size can be made in this regard, too.

Figure 5:
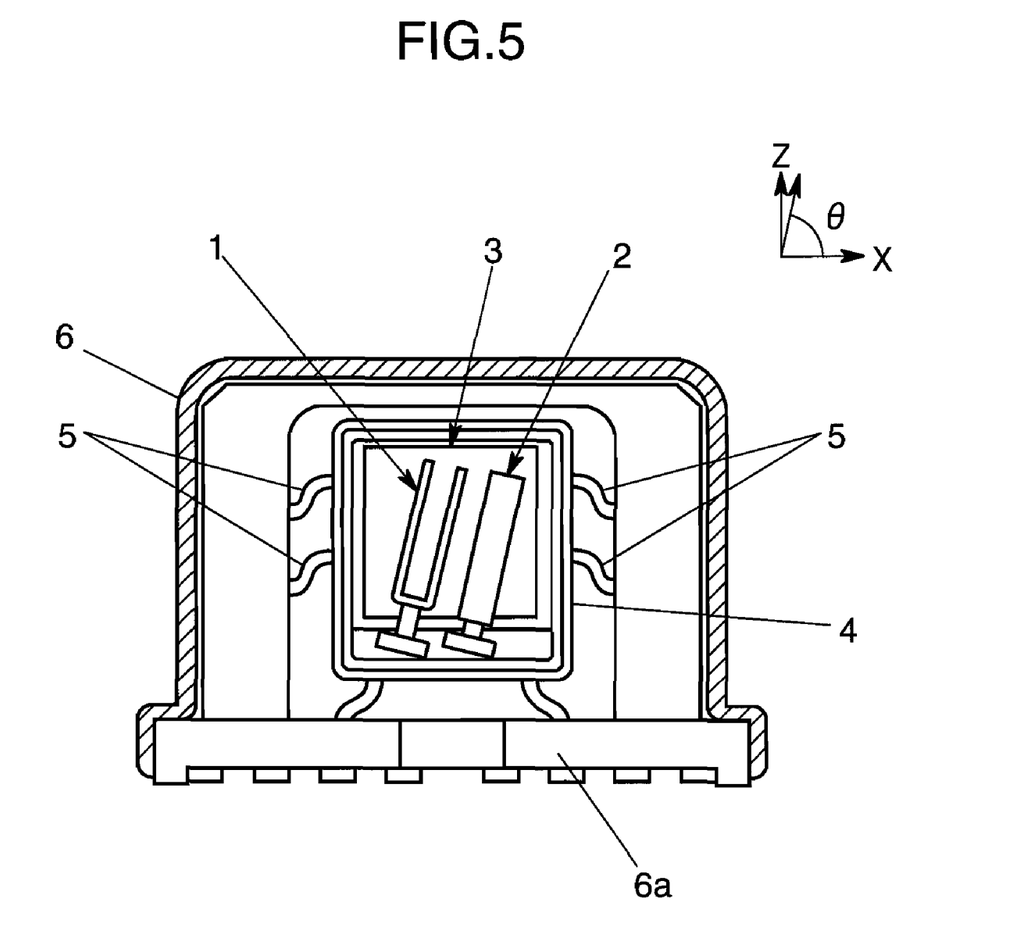
FIG. 5 is schematic longitudinal cross section showing a composite sensor according to still another embodiment.

Further, the configuration of FIG. 5 can be adopted.

Referring to FIG. 5, in the embodiment of the drawing, the vibration-type angular velocity sensor element 1 and the acceleration sensor element 2 are inclined on the front surface (the XZ plane) at a certain angle θ (for example, 85° or 80°, or from 85° to 80° in reference to the X axis) with respect to an attachment portion 6a of the exterior package 6. In other words, it is preferable that, in reference to the attachment portion 6a of the exterior package 6, the angular velocity sensor element 1 is disposed so that it is aligned along a direction in which the detection axis is inclined with respect to a direction perpendicular to the attachment portion 6a of the exterior package 6, while the acceleration sensor element 2 is disposed so that the detection direction thereof is inclined with respect to the attachment portion 6a of the exterior package 6. Alternatively, it is preferable to incline the detection direction of the angular velocity sensor element 1 with respect to a direction perpendicular to the attachment portion 6a of the exterior package 6 while disposing the angular velocity sensor element 1 itself and the detection axis of the acceleration sensor element 2 to be parallel to each other.

Figure 6:
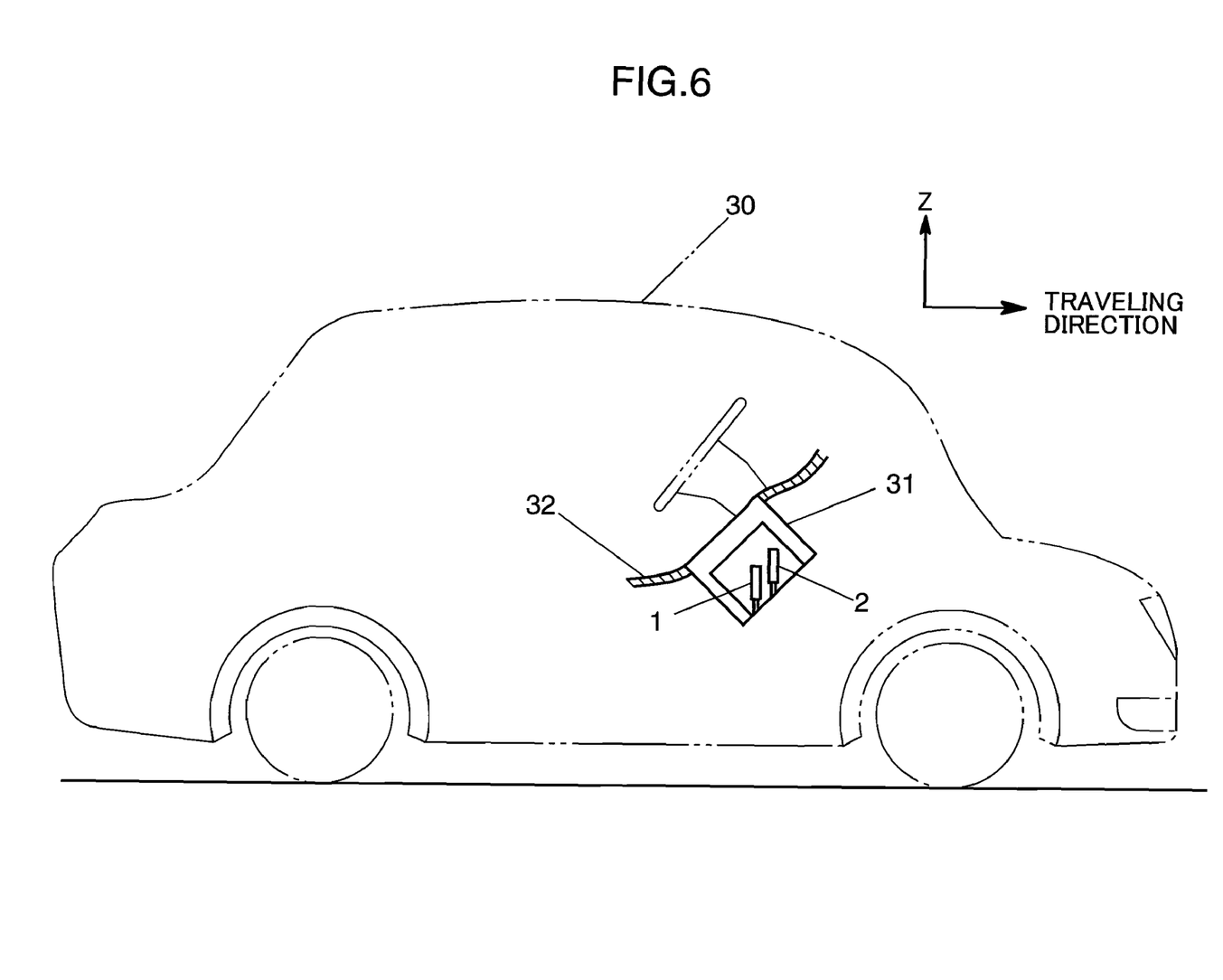
FIG. 6 is a schematic side view of a system (vehicle) adopting the composite sensor of FIG. 5.

Referring to FIG. 6, in a case where the composite sensor of FIG. 5 is attached to a vehicle, in particular, an automobile 30, it is often incorporated into a car navigation system 31. The car navigation system 31 is often attached to a center console 32 of the automobile 30.

The devices provided to the center console 32 are attached in such a manner that the front surfaces of the devices (the surfaces on the front side toward the driver and the passengers, the operation surfaces) face diagonally upward by taking into account the ease of operation and the allocation of a larger in-car space (a space extending long in the front-rear direction).

The navigation system 31 or the like having the composite sensor inside is therefore attached diagonally, too.

In the case of the automobile 30, it is preferable and ideal that the detection axis of the angular velocity sensor element 1 (the axis in the Z direction of FIG. 6) is perpendicular to the traveling direction and the detection direction of the acceleration sensor element 2 is parallel to the traveling direction. This is because when they are inclined, they are only able to detect the cosine components alone, which gives rise to a detection error.

Accordingly, by inclining the angular velocity sensor element 1 and the acceleration sensor element 2 within the interior package in advance so that the detection axis of the angular velocity sensor element 1 is perpendicular to the traveling direction and the detection direction of the acceleration sensor element 2 is parallel to the traveling direction in packaging the vibration-type angular velocity sensor element 1 and the acceleration sensor element 2 to the automobile 30, it is possible to achieve an ideal configuration in which a detection error hardly occurs.

That is, both sensor elements 1 and 2 are inclined and attached to the interior package 4 so that the detection axis (the axis in the Z direction) of the vibration-type angular velocity sensor element 1 is perpendicular to the moving direction of a system and the direction of acceleration detected by the acceleration sensor element 2 is parallel to the moving direction in packaging the exterior package 6 to the system. According to this embodiment, in packaging the exterior package 6 to the automobile 30 as the system, each of the sensor elements 1 and 2 is disposed in the system in the most suitable position to detect the corresponding physical amount (that is, an angular velocity or acceleration). It is thus possible to maintain the detection accuracy of these sensor elements 1 and 2 as high as possible. In addition, because both sensor elements 1 and 2 are disposed in an inclined position with respect to the interior package 4, it is possible to shorten the dimensions of the interior package 4 in the top-bottom and right-left directions, which can make a contribution to a further reduction in size as a consequence.

In each of the embodiments described above, the interior package 4 and the exterior package 6 are of a package structure. However, they are not necessarily of the package structure or a hermetical structure, but may be of an open shape, for example, a planar shape. Formed in the package structure, however, it becomes possible to prevent mechanical damage to the angular velocity sensor element 1 and the acceleration sensor element 2 accommodated inside. Further, formed in the hermetical structure, it is possible to prevent dust or humidity from entering inside. The reliability of the respective elements 1 and 2 can be therefore enhanced.

Figure 7:
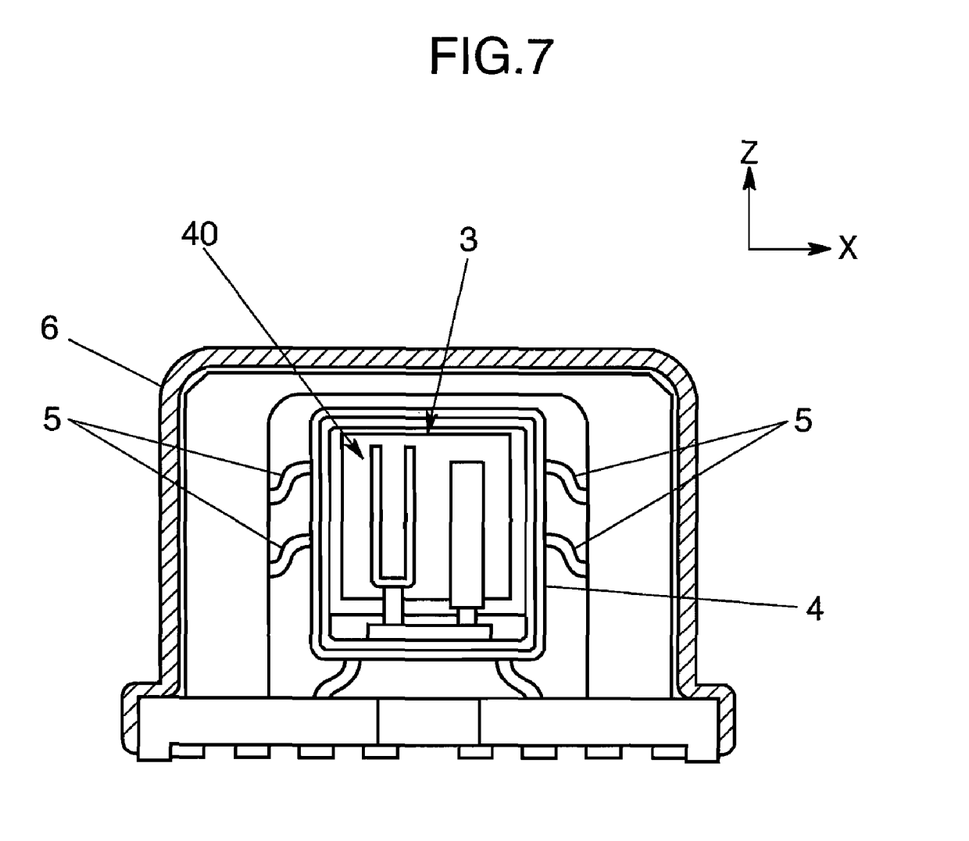
FIG. 7 is a schematic longitudinal cross section showing a composite sensor according to still another embodiment.

In addition, it is possible to adopt, as a sensor element, a sensor element 40 furnished with both the capability of detecting an angular velocity and the capability of detecting acceleration as is shown in FIG. 7.

As has been described, one aspect of the present invention is a composite sensor which is provided with: an external holding portion; an internal holding portion accommodated within the external holding portion; a vibration-type angular velocity sensor element and an acceleration sensor element disposed within the internal holding portion; supporting members provided to the internal holding portion to support both sensor elements so that a driving plane of the vibration-type angular velocity sensor element and a detection direction of the acceleration sensor element become parallel to each other; and coupling portions interposed between the internal holding portion and the external holding portion and having flexibility only in a direction perpendicular to the driving plane of the vibration-type angular velocity sensor element.

In other words, the present invention is a composite sensor characterized by provided with: an external holding portion; an internal holding portion supported within the external holding portion via coupling portions; and a vibration-type angular velocity sensor element and an acceleration sensor element disposed within the internal holding portion, wherein the internal holding portion is held in such a manner so as to substantially suppress a movement of the acceleration sensor element along a detection direction while to allow a movement of the vibration-type angular velocity sensor element along a direction in which the vibration-type angular velocity sensor element receives Coriolis force at least by an angular velocity.

According to this aspect, in order to detect an angular velocity, the vibration-type angular velocity sensor element vibrates in a specific direction and loci along the specific direction define a driving surface. The angular velocity sensor element detects an angular velocity as acceleration is applied to a system incorporating the composite sensor. Meanwhile, because the external holding portion and the internal holding portion undergo relative displacement with respect to each other as the coupling portions bend, disturbance in a direction orthogonal to the driving plane is absorbed by the displacement and therefore hardly propagated to the vibration-type angular velocity sensor element. It is thus possible to reduce disturbance to the angular velocity sensor element to the extent possible. On the other hand, by adopting the layout as described above, a force parallel to the driving plane that has propagated to the system is transmitted to the internal holding portion from the external holding portion via the coupling portions and detected by the acceleration sensor element. Hence, when an impact is added to the system, acceleration on the basis of an impact can be detected at high sensitivity despite of the damper capability furnished to the coupling portions. Consequently, it is possible to process a signal by the same integrated circuit by incorporating the angular velocity sensor element and the acceleration sensor element in the same internal holding portion, which makes it possible to reduce the overall composite sensor in size to the extent possible while maintaining the detection ability of each sensor element at a high level. Besides the bending member as described in the embodiments above, a configuration to hold the internal holding portion by a combination of mechanisms may be adopted as a concrete embodiment of the coupling portions. Such mechanisms can be, for example, a method for coupling the external holding portion and the internal holding portion via rolling elements (rollers or balls) in bearings. Alternatively, as a suspension in a two-wheeled motor vehicle, it may be a configuration such that allows the internal holding portion to move in the Y direction alone with the use of a combination of a hallow circular cylinder and another circular cylinder fit therein. In addition, it may be a link mechanism. Further, it may be a spring-shaped site made integrally with the internal holding portion. Such a spring-shaped site is preferably formed in a wobbling shape or a shape in which a digital rectangular wave with large amplitude and short cycles is continuously folded. In a case where the coupling portions are formed of a separate member, vibration-proof rubber may be adopted. As such vibration-proof rubber, it is preferable to adopt those undergo distortion slightly (or has a small spring constant) for compression and undergo distortion markedly (or has a large spring constant) for a shearing force. In a case where such vibration-proof rubber or an elastic body is adopted, it is possible to allow bending in the Y direction in the drawings and suppress displacement in the X direction and the Z direction effectively.

Also, in a preferable aspect, the internal holding portion is an interior package having a ceramic laminated substrate and a processing circuit that processes an output signal from the vibration-type angular velocity sensor element and an output signal from the acceleration sensor element, and the vibration-type angular velocity sensor element, the acceleration sensor element, and the processing circuit are accommodated in a depressed portion formed in the ceramic laminated substrate. In this aspect, because the respective sensor elements and the processing circuit are accommodated in the ceramic laminated substrate, the insulation performance and the temperature/humidity stability are enhanced.

In another preferable aspect, the depressed portion in the interior package is formed in a shape of multiple steps, and the vibration-type angular velocity sensor element and the acceleration sensor element are mounted on different steps in such a manner so as to define a space from the processing circuit. In this aspect, by defining a space between the respective sensor elements and the processing circuit, it is possible to reduce an influence of heat from the processing circuit to the extent possible.

In another preferable aspect, the depressed portion in the interior package is formed in a shape of multiple steps, and the vibration-type angular velocity sensor element and the acceleration sensor element are mounted on one step while the processing circuit is mounted on another step so as to define a space from the vibration-type angular velocity sensor element and the acceleration sensor element. In this aspect, too, by defining a space between the respective sensor elements and the processing circuit, it is possible to reduce an influence of heat from the processing circuit to the extent possible. In addition, because both sensor elements can be disposed within the plane of the processing circuit, a contribution can be made to a further reduction in size.

In another preferable aspect, the processing circuit is disposed in a state where it is in plane-contact with the ceramic laminated substrate. In this aspect, it is possible to release heat from the processing circuit more efficiently.

In another preferable aspect, the vibration-type angular velocity sensor element and the acceleration sensor element are disposed side by side on a same fixedly attaching surface. In this aspect, because the both sensor elements can be aligned side by side in close proximity to the extent possible, the dimension in the side-by-side alignment direction can be set shorter.

In another preferable aspect, the vibration-type angular velocity sensor element and the acceleration sensor element are inclined and attached to the interior package. In this aspect, in packaging the exterior package to a system, each sensor element is disposed in the system in the most suitable position to detect the corresponding physical amount (that is, an angular velocity or acceleration). It is thus possible to maintain the detection accuracy of these sensor elements as high as possible. More concretely, it is preferable that, in reference to the bottom portion of the external holding portion, the angular velocity sensor element is disposed so that it is aligned along a direction in which the detection axis is inclined with respect to a direction perpendicular to the bottom portion of the external holding portion, while the acceleration sensor element is disposed so that the detection direction thereof is inclined with respect to the bottom portion of the external holding portion. Alternatively, it is preferable to incline the detection direction of the angular velocity sensor element with respect to a direction perpendicular to the bottom portion of the external holding portion while disposing the angular velocity sensor element itself and the detection axis of the acceleration sensor element to be parallel to each other.

In another preferable aspect, the vibration-type angular velocity sensor element and the acceleration sensor element are fixed to the internal holding portion in positions for a detection axis of the vibration-type angular velocity sensor element and a detection direction of the acceleration sensor element to go along in parallel. In this aspect, because the both sensors can be laid out within the dimensions in the height direction of the respective sensor elements, a contribution to a reduction in size can likewise be made in this regard.

In another aspect, the coupling portion is a plate member made of metal. In this aspect, it is possible to readily achieve a configuration in which the coupling portions bend in a specific direction alone and maintain rigidity in another direction.

Further, in a concrete aspect, plate surfaces of the coupling portions are formed in an S shape. In this aspect, the coupling portions are enabled to secure high flexibility by increasing an extension distance in a specific direction within a limited space while securing high rigidity in another direction.

In still another aspect, the internal holding portion is an interior package and the external holding portion is an exterior package accommodating the internal holding portion therein, and the interior package is disposed in a rectangular depressed portion provided in the exterior package with a space in between while the coupling portions are provided symmetrically at least to two mutually opposing surfaces among inner surfaces of the exterior package. In this aspect, it is possible to change the specification as needed in response to a total mass of the inner holding portion including the sensor elements and the integrated circuit and the required flexibility and rigidity, which in turn makes it possible to obtain a suitable characteristic for system by system to be used.

In yet another concrete aspect, the coupling portions are disposed to portions where at least the respective sensor elements are fixed to the internal holding portion. In this aspect, the coupling portions elastically support portions where the disturbance is most readily propagated, and thereby become able to absorb the disturbance.

Also, in still another aspect, it is preferable that the vibration-type angular velocity sensor element and the acceleration sensor element are integrated into a single sensor element. "Be integrated" referred to herein means that a single sensor element is furnished with both the capability of the vibration-type angular velocity sensor element and the capability of the acceleration sensor element.

The composite sensor of the present invention has an advantage that a size reduction can be achieved, and it is useful, in particular, for electronic equipment that has become more compact and further expanded in functionality.

The invention claimed is:

1. A composite sensor, comprising:
an external holding portion;
an internal holding portion supported within said external holding portion via a coupling portion; and a vibration angular velocity sensor element and an acceleration sensor element disposed within said internal holding portion, wherein said internal holding portion is held in such a manner so as to substantially suppress relative movement between said external holding portion and said internal holding portion along a direction in which said acceleration sensor element detects acceleration, while allowing relative movement between said external holding portion and said internal holding portion along a direction in which said vibration angular velocity sensor element receives Coriolis force at least by an angular velocity, so as to be able to absorb disturbance which would affect said vibration angular velocity sensor element.

2. The composite sensor according to claim 1, wherein:

said internal holding portion is an interior package having a ceramic laminated substrate and a processing circuit that processes an output signal from said vibration angular velocity sensor element and an output signal from said acceleration sensor element, and said vibration angular velocity sensor element, said acceleration sensor element, and said processing circuit are accommodated in a depressed portion formed in said ceramic laminated substrate.

3. The composite sensor according to claim 2, wherein:

said depressed portion formed in said ceramic laminated substrate of said interior package is formed in a shape of multiple steps, and said vibration angular velocity sensor element and said acceleration sensor element are mounted on different steps in such a manner so as to define a space from said processing circuit.

4. The composite sensor according to claim 2, wherein:

said depressed portion formed in said ceramic laminated substrate of said interior package is formed in a shape of multiple steps, and said vibration angular velocity sensor element and said acceleration sensor element are mounted on one step while said processing circuit is mounted on another step so as to define a space between said vibration angular velocity sensor element and said acceleration sensor element.

5. The composite sensor according to claim 1, wherein:

said vibration angular velocity sensor element and said acceleration sensor element are disposed side by side on a same fixedly attaching surface.

6. The composite sensor according to claim 2, wherein:

said vibration angular velocity sensor element and said acceleration sensor element are inclined and attached to said interior package.

7. The composite sensor according to claim 1, wherein:

said vibration angular velocity sensor element and said acceleration sensor element are fixed to said internal holding portion in positions for a detection axis of said vibration angular velocity sensor element and a detection direction of said acceleration sensor element to go along in parallel.

8. The composite sensor according to claim 1, wherein:
said coupling portion is a plate member made of metal.

9. The composite sensor according to claim 8, wherein:
plate surfaces of said coupling portion are formed substantially in an S shape.

10. The composite sensor according to claim 1, wherein:
said internal holding portion is an interior package and said external holding portion is an exterior package accommodating said internal holding portion therein; and said interior package is disposed in a rectangular depressed portion provided in said exterior package with a space in between, and said coupling portion are provided symmetrically at least to two mutually opposing surfaces among inner surfaces of said exterior package.

11. The composite sensor according to claim 1, wherein:
said coupling portion is disposed to portions where at least said respective sensor elements are fixed to said internal holding portion.

12. The composite sensor according to claim 1, wherein:
said vibration angular velocity sensor element and said acceleration sensor element are integrated into a single sensor element.

\* \* \* \* \*